United States Patent Office 2,989,390
Patented June 20, 1961

2,989,390
POLYVINYLPYRIDINIUM PERCHLORATES
Hugh P. Jenkins, Jr., Chemistry Div. Naval Ordnance Test Station, Inyokern, Calif., Ross W. Moshier, Mound Laboratory, Miamisburg, Ohio, and Richard D. Cadle, Stanford Research Institute, Palo Alto, Calif.
No Drawing. Filed Dec. 22, 1949, Ser. No. 134,591
8 Claims. (Cl. 52—18)
(Granted under Title 35, U.S. Code (1952), sec. 266)

This invention relates to polyvinylpyridinium perchlorates.

It is an object of this invention to produce oxygen-rich organic compounds, particularly such compounds as may be used for propellent and explosive purposes.

The object of this invention is achieved by the preparation of polyvinylpyridinium perchlorates which may be prepared either by polymerizing a vinylpyridine (preferably either 2-vinylpyridine or 4-vinylpyridine) and reacting the polymer with perchloric acid to form the perchlorate salt; or the vinylpyridinium perchlorate can first be prepared and the resulting salt then polymerized.

Substances according to this invention have been prepared in the following exemplary ways:

Example I

Approximately 10 grams of freshly distilled 2-vinylpyridine and 0.1 gram of benzoyl peroxide were heated at 80° C. for two hours, and at 140° C. for two more hours. The resulting syrup was vacuum distilled to free it of monomers; the residue was polyvinylpyridine. One-half gram of this polyvinylpyridine was added to water to which had been added 0.68 gram of 70% perchloric acid. The resin became sticky and dissolved upon heating to boiling. The material which separated upon cooling was a sticky mass which dried to a brittle solid in an 85° C. oven. It burned readily even in an inert atmosphere.

Example II 2-vinylpyridine (0.5 gram) and 70% perchloric acid (0.68 gram) were dissolved in approximately 15 milliliters of water. Urea peroxide (0.1 gram) was added and the mixture was boiled under a reflux condenser for two hours and allowed to stand over-night. A voluminous white precipitate separated and was removed by suction filtration. The dried precipitate burned rapidly with a smoky flame and exploded when hit with a hammer against steel.

Example III

Polyvinylpyridine (0.5 gram) and 70% perchloric acid (2.29 grams) were added to about 50 ml. of water and boiled down to dryness. An amount of triacetin equal in weight to 5% of the residue was added and the mixture was again boiled with water and evaporated to dryness. Triacetin was used as a plasticizer. The product was extended into a strand, ⅛" by 4", which burned at the rate of 0.1" per second at atmospheric pressure.

Example IV

Polyvinylpyridinium perchlorate was prepared by adding equal chemical equivalents of perchloric acid and of polyvinylpyridine to water, boiling and evaporating to dryness, and drying in an 85° C. oven. Nitroglycerin (0.3 gram) and polyvinylpyridinium perchlorate (0.4 gram) were dissolved in acetone and the acetone was removed by evaporation. The residue was a tough thermoplastic mass which had approximately the same sensitivity to impact as the polyvinylpyridinium perchlorate prepared as above.

The polyvinylpyridinium perchlorates constituting the instant invention have the outstanding advantage that plastic properties, oxidizer, and fuel are combined in each molecule, thereby increasing simplicity and homogeneity of the system.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. Method for making a combustible composition comprising polymerizing a vinylpyridine and reacting same with perchloric acid.
2. Method of making a combustible material comprising polymerizing 2-vinylpyridine with benzoyl peroxide and reacting same with perchloric acid.
3. Method of making a combustible material comprising reacting a vinylpyridine with perchloric acid and polymerizing the product with urea peroxide.
4. Method of making a combustible composition comprising the following steps in any order: reacting 2-vinylpyridine with perchloric acid, and polymerizing the 2-vinylpyridine with a material selected from the group consisting of benzoyl peroxide and urea peroxide.
5. A combustible composition comprising a perchloric acid salt of polymerized vinylpyridine and nitroglycerin.
6. A combustible material comprising a perchloric acid salt of polymerized vinylpyridine and triacetin.
7. A perchloric acid salt of polymerized vinylpyridine.
8. A combustible material comprising a perchloric acid salt of polymerized vinylpyridine and a material selected from the group consisting of triacetin and nitroglycerin.

References Cited in the file of this patent

UNITED STATES PATENTS

| | | |
|---|---|---|
| 1,964,222 | Scott | June 26, 1934 |
| 2,334,149 | Ripper | Nov. 9, 1943 |
| 2,406,572 | Vogl | Aug. 27, 1946 |
| 2,416,639 | Pearsall | Feb. 25, 1947 |
| 2,484,430 | Sprague et al. | Oct. 11, 1949 |